Patented Oct. 27, 1942

2,300,119

UNITED STATES PATENT OFFICE 2,300,119

PROCESS OF MAKING LIGHT-COLORED BITUMINOUS MATERIALS

August Holmes, Cranford, N. J., assignor to Standard Oil Development Company, a corporation of Delaware No Drawing. Application October 21, 1939, Serial No. 300,558

2 Claims. (Cl. 196—13)

This invention relates to improvements in the production of light-colored bituminous plastics and more particularly it relates to the improvements in the separation of light-colored petroleum plastics from petroleum oils.

It is well known that in refining petroleum oils, the more volatile fractions, such as gasoline, kerosene, gas oil, and light lubricating oils, are first removed by distillation, leaving a residual oil consisting of the high boiling heavy oil fractions and asphaltic materials when an asphaltic crude oil is distilled.

An object of this invention is to produce relatively light-colored plastics from the black residual oils obtained by the distillation of crude petroleum oils.

According to this invention, a black colored residual asphaltic oily material is obtained by distilling off the volatile hydrocarbons from an asphaltic base petroleum crude oil. This black colored residual asphalt contains not only oil and black asphalt (asphaltenes) but also light-colored plastic materials that are separated from both the black asphalt and oil. The black colored asphaltic residual material is first treated with a solvent to dissolve all or part of the said residual material, that is, the black asphalt (asphaltenes) may or may not be dissolved in the solvent. The black asphalt or asphaltene-like materials are generally first separated, either by dissolving out all of the other ingredients of a residual oil or dissolving the whole residual oil and precipitating the black asphalt by the addition of a precipient. The second step is to separate the oil from the light-colored bituminous plastic material by the addition of more of the same solvent used to precipitate the black asphalt or another precipitant. The light-colored bituminous plastic material dissolved in a solvent may be treated with one or more decolorants to further reduce the color.

Example 1

A black residual asphaltic material is first dissolved in benzol and then 50% by volume of alcohol is added to the solution. The solution is allowed to settle and a solid black asphaltic material that settles out is removed. The residual solution is then treated with fuller's earth or any other decolorant. The decolorant is then removed and additional amounts of alcohol added and a light-colored bituminous plastic material precipitated which is separated and the solvent contained therein removed by heating,

Example 2

A black residual asphaltic material is treated with naphtha having an A. P. I. gravity of 86° and the insoluble residue separated. The naphtha solution is treated with a decolorant. The decolorant is separated and 50% by volume of absolute ethyl alcohol added and a light-colored bituminous plastic material is precipitated. The light-colored bituminous plastic material is separated and the solvent evaporated therefrom. Ether, esters, ketones, etc. may likewise be used to precipitate the light-colored bituminous plastic material.

Example 3

A black residual asphaltic material is treated with an ether, such as ethyl ether, in which only the lighter-colored bituminous materials are soluble. The undissolved residue, black asphalt, is separated and the solution treated with a decolorant, such as fuller's earth. The decolorant is then separated and the light-colored solution is precipitated by the addition of an alcohol, such as ethyl alcohol, to recover the relatively light-colored plastic material.

Example 4

A black residual asphaltic material is digested with methyl alcohol (absolute or anhydrous). The oils are dissolved by the methyl alcohol and separated. A residue is obtained which is further treated with an ether, such as ethyl ether, in which the light-colored bituminous material is dissolved, leaving as a residue the black colored asphalt. This light-colored bituminous material may then be treated with a decolorant, such as fuller's earth, activated carbon, etc. The light-colored bituminous material may then be recovered by evaporation from the solution after the latter has been separated from the decolorant.

Example 5

A black residual asphaltic material is mixed with a liquid hydrocarbon that is normally gaseous at ordinary temperatures, such as propane, butane, etc., and black asphalts (asphaltenes) are precipitated and removed. The residual solution is then heated and a light-colored plastic material is precipitated and separated. The separated light-colored plastic material is then treated with aniline to further concentrate the light-colored plastic material which is present.

I claim:

1. A method of separating from an asphaltic base crude a light-colored plastic material which comprises distilling a petroleum oil containing asphalt to obtain a black residual oil, digesting the black residual oil with a naphtha of about 86° A. P. I. gravity, separating the undissolved bodies and treating the naphtha solution with a decolorant, separating the decolorant and precipitating from the naphtha solution a light-colored bituminous plastic material by the fractional addition of an oxygenated organic solvent, selected from the class consisting of alcohols, ethers and ketones, which solvent is miscible with the naphtha and in which the light colored plastic bituminous materials are insoluble.

2. A method of separating from an asphaltic base crude a light-colored plastic material which comprises distilling a petroleum oil containing asphalt to obtain a black residual oil, digesting the black residual oil with a naphtha of about 86° A. P. I. gravity, separating the undissolved bodies and treating the naphtha solution with a decolorant, separating the decolorant and precipitating from the naphtha solution a light-colored bituminous plastic material by the fractional addition of ethyl alcohol which is miscible with the naphtha and in which the light colored plastic bituminous materials are insoluble.

AUGUST HOLMES.